United States Patent
Hogan

(10) Patent No.: US 9,604,273 B1
(45) Date of Patent: Mar. 28, 2017

(54) AXIAL SWAGE TOOL

(71) Applicant: Veigh Hogan, O'Fallon, MO (US)

(72) Inventor: Veigh Hogan, O'Fallon, MO (US)

(*) Notice: Subject to any disclaimer, the term of this patent is extended or adjusted under 35 U.S.C. 154(b) by 99 days.

(21) Appl. No.: 14/688,140

(22) Filed: Apr. 16, 2015

Related U.S. Application Data

(60) Provisional application No. 61/989,062, filed on May 6, 2014.

(51) Int. Cl.
*B21D 39/04* (2006.01)
*B23P 19/027* (2006.01)
*F16L 33/207* (2006.01)

(52) U.S. Cl.
CPC .......... *B21D 39/046* (2013.01); *B23P 19/027* (2013.01); *F16L 33/2076* (2013.01)

(58) Field of Classification Search
CPC ... Y10T 29/5367; B25B 27/10; B21D 39/046; F16L 13/146; F16L 13/161; F16L 33/2076; B23P 19/027
USPC ......................................................... 29/237
See application file for complete search history.

(56) References Cited

U.S. PATENT DOCUMENTS

| | | | | |
|---|---|---|---|---|
| 1,665,915 A | * | 4/1928 | Ekman ................... | B21D 39/04 29/237 |
| 3,096,876 A | * | 7/1963 | Scudieri ............... | B21D 39/046 29/237 |
| 3,373,474 A | * | 3/1968 | Doerer ................. | B21D 39/046 29/237 |
| 3,626,450 A | * | 12/1971 | Browne ............... | B21D 39/046 29/237 |
| 3,726,122 A | * | 4/1973 | Dawson ............... | B21D 39/046 29/237 |
| RE29,802 E | * | 10/1978 | Whitledge ............. | B25B 27/10 29/237 |
| 4,189,817 A | | 2/1980 | Moebius | |
| 4,257,135 A | * | 3/1981 | Moebius .................. | B25B 7/06 29/237 |
| 5,305,510 A | | 4/1994 | Croft | |
| 5,398,394 A | * | 3/1995 | Hyatt ..................... | B21D 39/04 29/237 |
| 5,483,731 A | * | 1/1996 | Prendel ................... | B25B 27/10 29/237 |
| 5,592,726 A | * | 1/1997 | Suresh ................... | B21D 39/04 29/237 |
| 5,680,687 A | * | 10/1997 | Hyatt ..................... | B21D 39/04 29/237 |
| 5,694,670 A | | 12/1997 | Hosseinian | |
| 6,430,792 B1 | | 8/2002 | Foster | |
| 6,434,808 B1 | | 8/2002 | Mckay | |
| 6,618,919 B1 | | 9/2003 | Mckay | |

(Continued)

*Primary Examiner* — Joseph J Hail
*Assistant Examiner* — Marc Carlson
(74) *Attorney, Agent, or Firm* — CreatiVenture Law; Linda L Lewis; Dennis Donahue

(57) ABSTRACT

A swaging tool having a housing, a piston, a fixed jaw and a moveable jaw, wherein the housing is capable of receiving and holding a tube and a swage fitting in the fixed jaw; the moveable jaw is in communication with a moveable die and is capable of moving axially along the housing with respect to an axis for the tube and the swage fitting to connect the swage fitting to the tube and create a seal between the swage fitting and the tube, and two opposing arms attached to the moveable jaw that have an open and a closed position to hold the tube and swage in alignment.

12 Claims, 9 Drawing Sheets

(56) References Cited

U.S. PATENT DOCUMENTS

| | | | |
|---|---|---|---|
| 6,658,711 B1 | 12/2003 | Benson | |
| 6,823,573 B2 | 11/2004 | Morrison | |
| 7,155,790 B2 | 1/2007 | Palejwala | |
| 7,805,823 B2 * | 10/2010 | Sembritzky | B25B 27/10 29/234 |
| 7,984,538 B2 | 7/2011 | Mckay | |
| 8,256,079 B2 | 9/2012 | Hwang | |
| 8,272,128 B2 * | 9/2012 | Chawgo | H01R 43/0427 29/846 |
| 8,458,876 B2 * | 6/2013 | Danhash | B21D 39/04 29/237 |
| 8,631,553 B2 * | 1/2014 | Gleim | B21D 39/04 29/283.5 |
| 8,683,667 B2 | 4/2014 | Hwang | |
| 9,246,294 B2 * | 1/2016 | Chawgo | H01R 43/0427 |
| 2003/0167614 A1 * | 9/2003 | Morrison | B25B 27/10 29/237 |
| 2005/0081359 A1 * | 4/2005 | Palejwala | B25B 27/10 29/516 |
| 2009/0300917 A1 * | 12/2009 | Hwang | B21D 39/046 29/890.15 |
| 2012/0192393 A1 * | 8/2012 | Sindelar | B25B 27/10 29/237 |
| 2012/0317783 A1 * | 12/2012 | Hwang | B21D 39/046 29/428 |
| 2013/0086782 A1 * | 4/2013 | Dewell | B25B 27/10 29/237 |
| 2013/0093184 A1 * | 4/2013 | Peirce | B25B 27/10 285/323 |
| 2014/0020225 A1 * | 1/2014 | Raczuk | B25B 27/10 29/428 |

* cited by examiner ature patents are not admitted to be prior art with respect to the present invention by inclusion in this section.

AXIAL SWAGE TOOL

CROSS-REFERENCE TO RELATED APPLICATIONS

This application claims priority from U.S. Provisional Patent Application No. 61/989,062 filed May 6, 2014 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

This invention relates to swaging tools for use in swaging fittings, and more particularly to a swaging tool for swaging axially swaged fittings, to join tubes or pipes.

Related Art

In manufacturing aircraft, the assembly of different systems for the aircraft may require pipes, tubing, or other materials to be connected to each other. For example, in installing a hydraulic system in an aircraft, different tubes may be connected to each other to create a seal to contain fluids, such as hydraulic fluids, for the system.

One manner in which different pieces of tubing or other assemblies that may carry fluids can be connected to each other is by swaging. Swaging is a metal forming technique in which dimensions of an item are altered using a component into which the item is forced. In these examples, a metal tube may be connected to a swage fitting. The swage fitting may deform the metal tube to create a seal between the metal tube and the swage fitting. Another end of the swage fitting may be connected to another metal tube to connect the two tubes together. Similar types of processes may be performed for installing tubing for wiring or other items within an aircraft.

The swage fitting has an axis that may be aligned around or about the axis of the tubing. This type of swage fitting is also referred to as an axial swage fitting. The swage fitting may be moved towards the tubing to deform the tubing and/or swage fitting to create a connection. In these examples, the connections may be sealed connections, such that fluids do not leak out of the connection.

Prior art tools for assembling such a fitting to a fluid conduit often include a fixed jaw, a moveable jaw and one or more hydraulic cylinders for moving the moveable jaw toward the fixed jaw. The moveable jaw pushes a ring axially over the fitting body causing the swage fitting to compress or move radially into the fluid conduit to provide a seal and a mechanical connection. When the swaging is complete, hydraulic pressure in the one or more hydraulic cylinders is released allowing a return spring or some other method to return the moveable jaw to the starting position. This allows the tool to be removed from the fitting assembly. Examples of prior art installation tools are taught in U.S. Pat. No. 4,189,817 ("Hydraulic Assembly Tool for Tube Fittings"); U.S. Pat. No. 5,305,510 ("Hydraulic Assembly Tool with Improved Load Bearing Arrangement for Tube Fittings"); U.S. Pat. No. 5,694,670 ("Secure Swaging Tool"); U.S. Pat. No. 6,434,808 ("Compact Installation Tool"); and U.S. Pat. No. 6,618,919 ("Remote Actuation of Installation Tooling Pump"); U.S. Pat. No. 7,984,538 ("Hydraulic Hand Tool"); and U.S. Pat. No. 8,256,079 ("Apparatus of Swaging Components"), all of which are expressly incorporated herein by reference.

The tools for swaging axial swage fittings to tubes typically use a hydraulic pump that connects to the tool by a hose. Other drive mechanisms such as screw drives are also suitable for this device. These tools and/or the hoses for the pumps along with the tools to perform swaging are moved into the interior of the aircraft to perform swaging for systems being installed. The operator must support the full weight of the tool and keep the tool in alignment with one hand while pressurizing the pump with the other hand. Alternatively, the fitting installation is performed on a bench. An axially swaged fitting may require 10,000 pounds per square inch of hydraulic pressure to install the fitting.

Most axial swage tools have U-shaped fixed and moveable jaws that allow easy insertion and removal of the swage fitting. However, the U-shape also allows the fitting to easily move out of position as the hydraulic pressure is applied causing a misalignment. This can result in the tool breaking, and a dangerous situation for the operator because of the very high forces being generated.

Some axial swage tools have a cover that are attached by other means that completely encircle the opening and fastening on one or both sides. Such devices are disclosed in U.S. Pat. No. 7,984,538 and U.S. Pat. No. 8,256,079. This can be inconvenient and cumbersome, in that the cover must be fastened and unfastened with each attachment. U.S. Pat. No. 5,305,510 discloses spring-loaded retainers on the sides of the moveable jaw to secure the fitting. The retainers are small, complicated and easily damaged. Further, when high pressures are applied the springs could inadvertently release and fail to secure the fitting.

Therefore, it would be advantageous to have a method and apparatus that overcomes the disadvantages described above.

None of the above prior art devices do what the present invention does.

SUMMARY OF THE INVENTION

A swaging tool for communicatively attaching a swage fitting to tubing includes a generally tubular housing having a first end portion including a port for providing pressurized fluid, a second end portion defining a closed cylinder and an intermediate portion therebetween that includes an aperture through an outer surface of the housing. A moveable die is movably located within the housing, and axially extends through the intermediate housing portion. A fixed jaw unit is located on the second end portion of the housing and a moveable jaw unit communicates directly with the moveable die through the aperture. The fixed jaw can have a U-shaped first slot. The moveable jaw has a second slot with two opposing arms having a gap between the arms. The two arms have an open and a closed position. In the open position, a gap is equal to or greater than the diameter of the fitting, allowing the fitting to be inserted or removed. In the closed position, the gap is less than the diameter of the fitting is created, thereby securing the fitting in the jaw for swaging. In the closed position, the arms create a C-shape as opposed to a U-shape.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The following description of the preferred embodiment(s) is merely exemplary in nature and is in no way intended to limit the invention, its application, or uses.

DETAILED DESCRIPTION OF THE PREFERRED EMBODIMENTS

Figure 5:
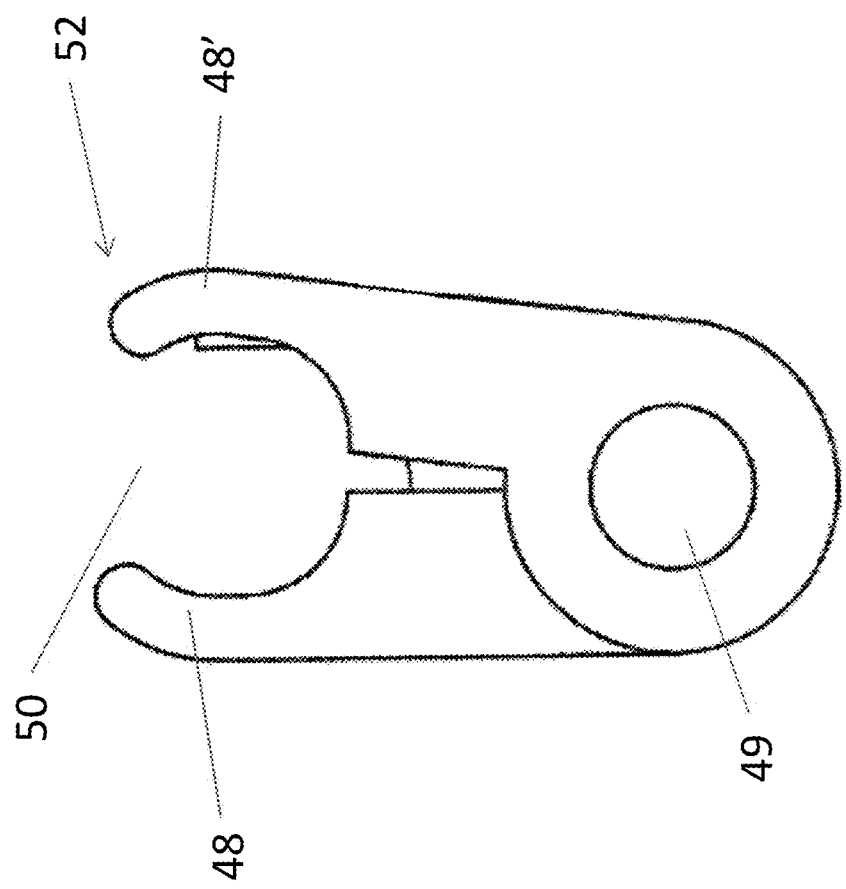
FIG. 5 is an end perspective drawing of the moveable jaw of an embodiment of the present invention having one hinged arm in the open position.
Figure 6:
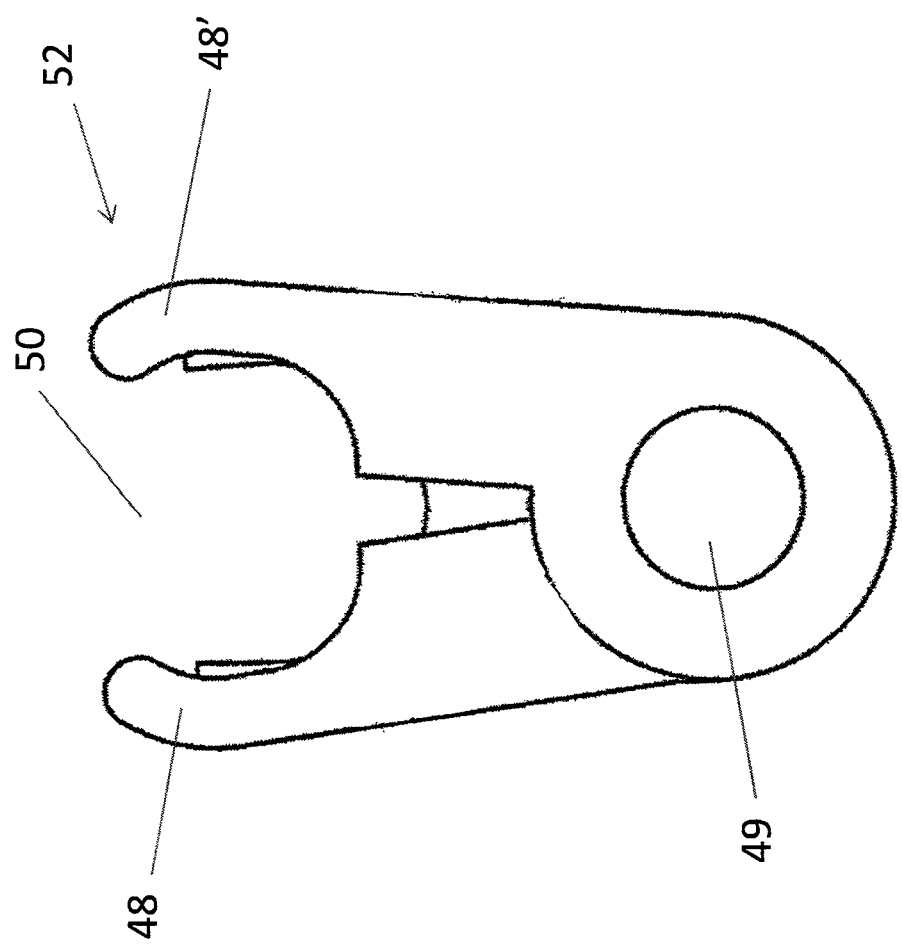
FIG. 6 is an end perspective drawing of the moveable die of an embodiment of the present invention having two hinged arms in the open position.
Figure 7:
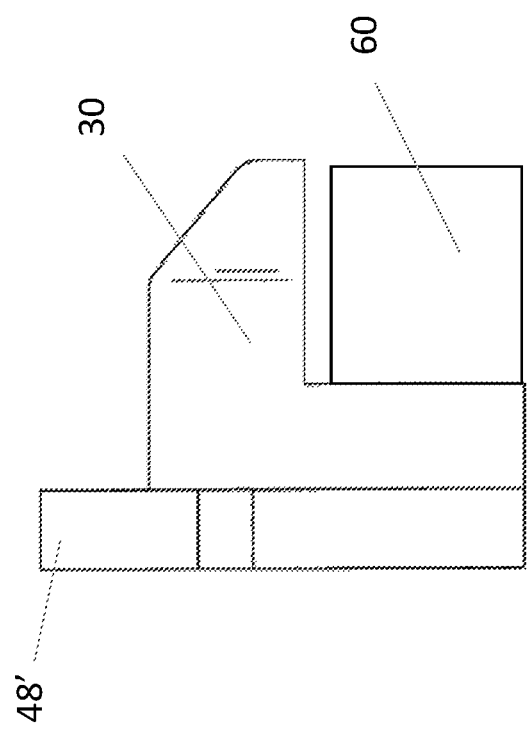
FIG. 7 is side perspective drawing of the moveable die of an embodiment of the present invention.
Figure 8:
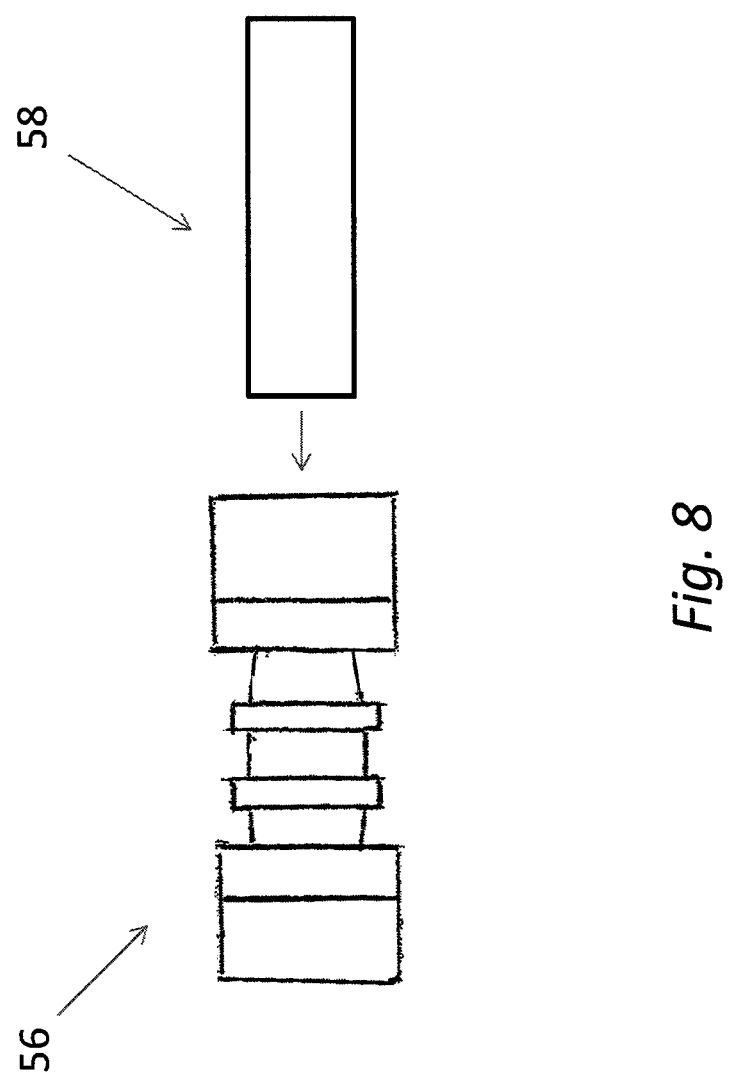
FIG. 8 is a side perspective drawing of a fitting and a tube.
Figure 9:
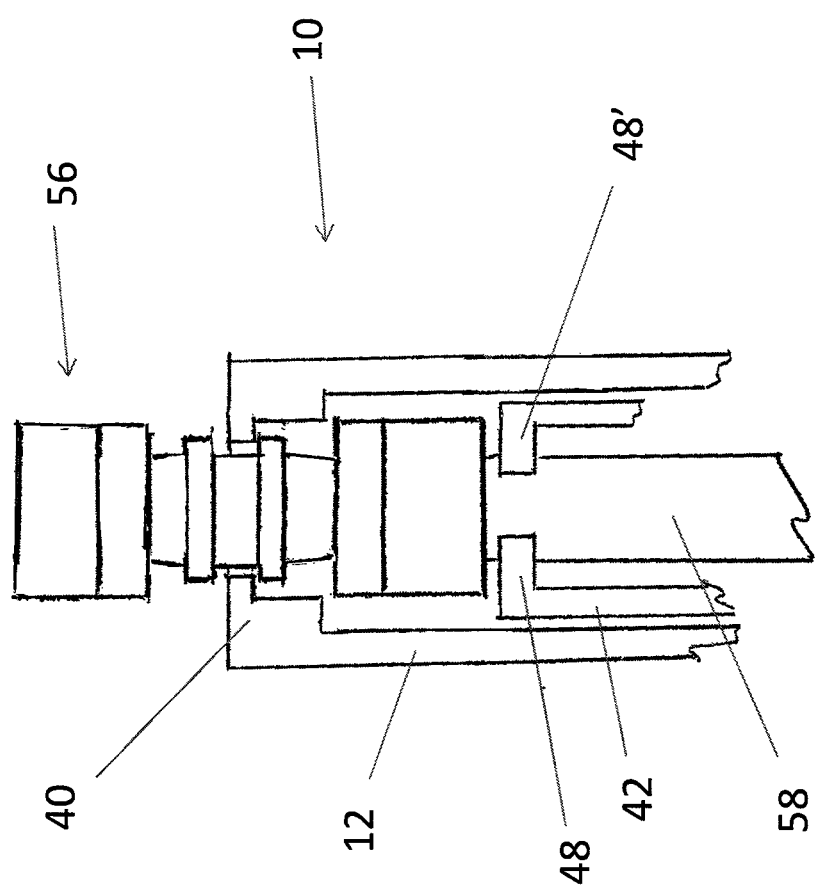
FIG. 9 is a top cut-away perspective drawing of a fitting in the axial swage tool of the present invention of an embodiment of the present invention.

As shown in FIGS. 1 through 9, a swaging tool 10 for communicatively attaching a swage fitting 56 to tubing 58 comprising a housing 12 having an outer surface 16 and an inner surface 14, and a first end portion 18 including a port 22 for providing pressurized fluid, and a second end portion 20 defining an enclosure 24, and an intermediate portion 26 therebetween that includes an aperture 28 through the outer surface of the housing. A moveable die 30 is movably located on the inner surface of the housing, and axially extending therethrough the intermediate housing portion. A fixed jaw 40 is located on the second end portion of the housing having a first slot 44. A moveable jaw 42 is directly engaged to the moveable die through the aperture, and the moveable jaw has a second slot 46 with a first arm 48 and a second arm 48' defining a gap 50. In a preferred embodiment, the first and second arms are directly engaged with the moveable die 30. In a preferred embodiment, as shown in FIG. 5, the two opposing arms have one arm fixed 48 and one arm hinged and moveable 48' between an open position 52 and a closed position 54. In another preferred embodiment as shown in FIG. 6, the two opposing arms have both arms 48 and 48' are hinged and moveable, and are shown in the open position. When the arms are in the open position, the gap is equal to or greater than the diameter of the fitting or tube. When the arms are in the closed position, the gap is less than the diameter of the fitting. In a preferred embodiment, when the arms are in the closed position, they are touching or overlapping.

Figure 1:
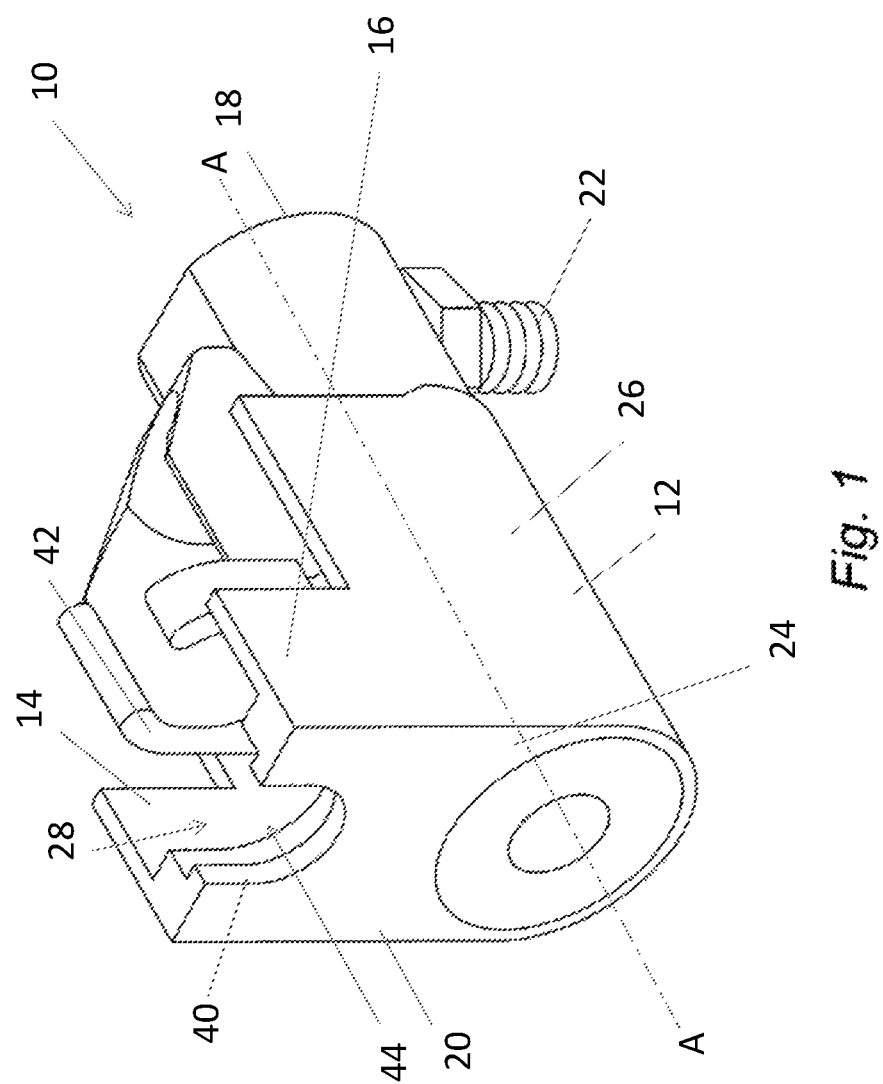
FIG. 1 is a raised perspective drawing of the axial swage tool of an embodiment of the present invention.
Figure 2:
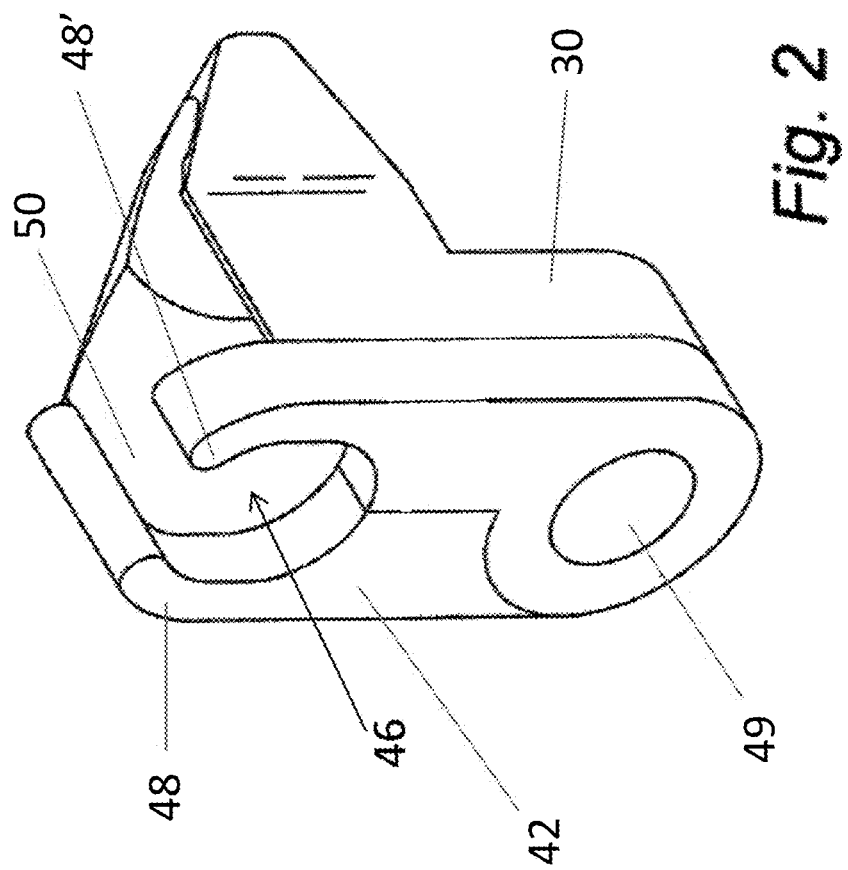
FIG. 2 is a raised perspective drawing of the moveable die.
Figure 3:
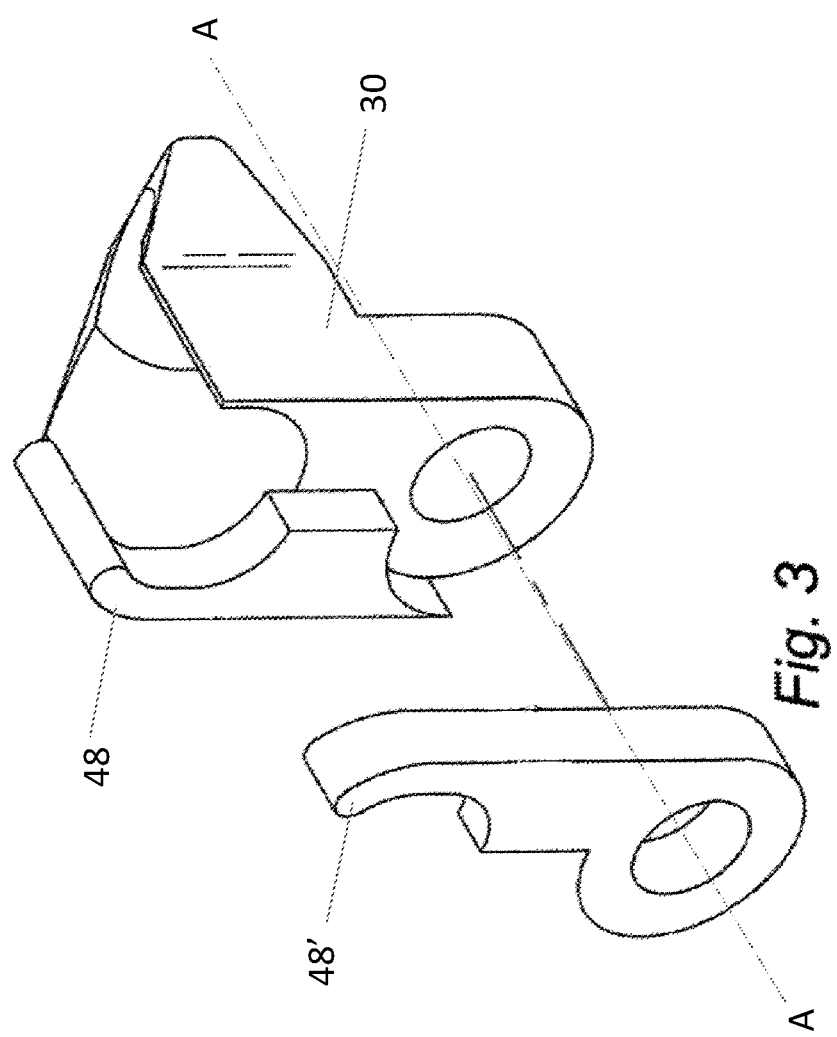
FIG. 3 is an expanded perspective drawing of the moveable die of an embodiment of the present invention.
Figure 4:
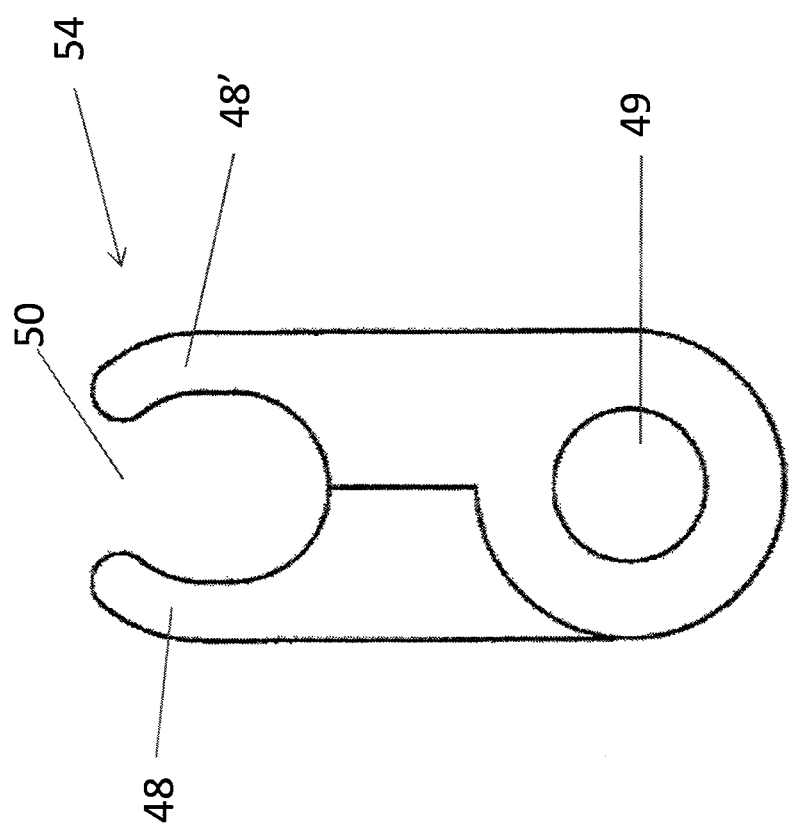
FIG. 4 is an end perspective drawing of the moveable jaw in the closed position of an embodiment of the present invention.

As shown in FIG. 2, a connecting member 49 is inserted into the moveable jaw, fastening the first and second arms. In a preferred embodiment, the connecting member 49 creates a hinge and a pivot point for at least one of the first and second arms. In a preferred embodiment, the connecting member maintains alignment during the movement of the moveable jaw which moves by means of the linear action of a hydraulic piston or screw 60. The connecting member and the hinge axis are coaxial with the axis of hydraulic piston or screw, as indicated by the A-A dashed line in FIGS. 1 and 3. In another preferred embodiment, the two hinged arms 48 and 48' are semi-circular or clam-shell in shape to better grip the fitting. It is preferred that the first and second arms are fastened solely by the connecting member 49 which fasten directly to the moveable die 30, thereby eliminating complicated fastening points and potential weak points that could give way under the high operating pressure of the swage tool.

In another preferred embodiment, the swaging tool 10 includes a separate and replaceable hydraulic cylinder attached to the housing 12.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A swaging tool for communicatively attaching a swage fitting to a tube comprising
    a housing having an outer surface and an inner surface, and a first end portion and a second end portion defining an enclosure, and an intermediate portion;
    a moveable die movably located on the inner surface of the housing, and axially extending through the intermediate housing portion;
    a fixed jaw located on the second end portion of the housing having a first slot;
    a moveable jaw directly engaged to the moveable die;
    wherein the moveable die is moved axially by a hydraulic piston or screw;
    wherein the moveable jaw has a second slot with a first arm, a second arm and a hinge;
    wherein the first arm and the second arm define a gap;
    wherein the hinge is coaxially aligned with the moveable die and the hydraulic piston or screw; and
    wherein the first and second arms have an open position and a closed position.

2. The swaging tool of claim 1 wherein the moveable jaw is located in the intermediate portion.

3. The swaging tool of claim 2, further comprising at least one of the two arms pivot.

4. The swaging tool of claim 3, further comprising a port for providing pressurized fluid located on the first end portion.

5. The swaging tool of claim 1, wherein the first and second arms are connected to the hinge and pivot.

6. The swaging tool of claim 5, further comprising the first and second arms pivotably attached to the moveable die by a connecting member.

7. The swaging tool of claim 1, further comprising the first arm pivotably attached to the moveable die by a connecting member.

8. A swaging tool for communicatively attaching a swage fitting to a tube comprising
- a housing having an outer surface and an inner surface, and a first end portion and a second end portion defining an enclosure, and an intermediate portion;
- a moveable die movably located on the inner surface of the housing, and axially extending through the intermediate housing portion;
- a fixed jaw located on the second end portion of the housing having a first slot;
- a moveable jaw directly engaged to the moveable die;
- wherein the moveable die is moved axially by a hydraulic piston or screw;
- wherein the moveable jaw is located in the intermediate portion;
- wherein the moveable jaw has a second slot with a first arm, a second arm and a hinge;
- wherein the first arm and the second arm define a gap;
- wherein the first arm is pivotably attached to the moveable die by a connecting member;
- wherein the hinge is coaxially aligned with the moveable die and the hydraulic piston or screw; and
- wherein the first and second arms have an open position and a closed position.

9. The swaging tool of claim 8, further comprising the first and second arms are semi-circular.

10. The swaging tool of claim 8, further comprising the first and second arms are clam-shell shaped.

11. The swaging tool of claim 8, further comprising both arms pivotably attached to the moveable die by the connecting member.

12. The swaging tool of claim 8 further comprising the connecting member maintaining alignment of the moveable jaw with the fixed jaw.

* * * * *